United States Patent
Olson (10) Patent No.: US 6,854,771 B1
(45) Date of Patent: Feb. 15, 2005

(54) LOW PRESSURE FITTING

(75) Inventor: Darwin Olson, Franklin, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/141,882

(22) Filed: May 10, 2002

(51) Int. Cl.⁷ .............................................. F16L 35/00
(52) U.S. Cl. ....................... 285/305; 285/321; 251/145
(58) Field of Search ................................ 285/305, 321; 251/145, 133, 366

(56) References Cited

U.S. PATENT DOCUMENTS

| | | | | |
|---|---|---|---|---|
| 2,084,431 A | * | 6/1937 | Catley | 285/321 |
| 2,506,722 A | * | 5/1950 | Kuehn et al. | 137/34 |
| 2,591,514 A | * | 4/1952 | Courtot | 137/34 |
| 2,690,895 A | * | 10/1954 | Barcus | 251/297 |
| 2,944,840 A | * | 7/1960 | Wiltse | 285/232 |
| 3,294,118 A | * | 12/1966 | Wieden et al. | 137/588 |
| 3,479,068 A | | 11/1969 | Brittain | |
| 3,540,760 A | | 11/1970 | Miller | |
| 3,565,100 A | * | 2/1971 | Pfleger | 137/269.5 |
| 3,593,962 A | * | 7/1971 | Sullivan | 251/353 |
| 3,637,239 A | * | 1/1972 | Daniel | 295/93 |
| 4,281,601 A | | 8/1981 | Overman | |
| 4,316,600 A | * | 2/1982 | Parise et al. | 251/245 |
| 4,565,392 A | | 1/1986 | Vyse | |
| 4,580,816 A | * | 4/1986 | Campbell et al. | 285/321 |
| 4,603,886 A | | 8/1986 | Pallini, Jr. et al. | |
| 4,783,100 A | * | 11/1988 | Klein | 285/276 |
| 5,110,088 A | * | 5/1992 | Shih | 251/149.1 |
| 5,344,119 A | * | 9/1994 | Wang | 251/149.1 |
| 5,433,410 A | * | 7/1995 | Foltz | 251/100 |
| 5,570,910 A | * | 11/1996 | Highlen | 285/321 |
| 5,671,955 A | | 9/1997 | Shumway | |
| 5,687,951 A | * | 11/1997 | Bamberger et al. | 251/145 |
| 5,826,920 A | | 10/1998 | Bartholomew | |
| 5,911,404 A | * | 6/1999 | Cheng | 251/149.6 |

\* cited by examiner

Primary Examiner—Eric K. Nicholson
(74) Attorney, Agent, or Firm—Honigman Miller Schwartz and Cohn LLP (57) ABSTRACT

Fittings configured as quick-connect couplings or valve assemblies utilize an O-ring to lock a male member within a female member. The O-ring engages a shoulder to both effect a seal and to prevent axial motion of the male member with respect to the female member. In accordance with one embodiment of this invention, pressure within lines coupled by the quick-connect couplings is used to effect locking of the couplings and in accordance with another embodiment, pressure within a container with which the valve assembly is used effects locking of the coupling.

7 Claims, 9 Drawing Sheets

LOW PRESSURE FITTING

FIELD OF THE INVENTION

The present invention relates to low pressure fittings. More particularly, the present invention relates to low pressure fittings such as low pressure couplings and low pressure valves.

BACKGROUND OF THE INVENTION

There is a constant need for fittings used to convey and contain fluids. Since there are millions of these fittings used in millions of devices, it is desirable to configure these fittings so that they are both low in cost and reliable. Exemplary of such fittings are low pressure quick-connect fittings, which have replaced threaded fittings in thousands of applications, and valves which vent devices such as pressurized air containers and provide liquid drains for containers. With respect to keeping costs of such fittings as low as possible, there are needs for designs which can been machined, molded or end formed. It is also desirable to have components which are easy and inexpensive to manufacture and which do not require substantial changes in manufacturing know-how.

In configuring relatively simple devices, it is also desirable to use components and materials which have been extensively tested and have capabilities which are understood so that the limits of reliability are readily understood. This allows a designer and manufacturer to avoid over designing components so as to minimize manufacturing costs and perhaps spend manufacturing dollars on other aspects of the device using the fitting.

SUMMARY OF THE INVENTION

In view of the aforementioned considerations and other considerations, the present invention is directed to a fitting for coupling a male member to a female member wherein the female member comprises a receptacle having an inner wall, the inner wall having a shoulder adjacent the opening of the receptacle. The male member has an outwardly opening groove and is received in the female member with a gap therebetween. An O-ring is seated between the groove in the male member in the shoulder of the receptacle to prevent removal of the male member from the receptacle.

In a further aspect of the invention the O-ring also seals the gap between the male and female members. In accordance with one embodiment of the invention, the fitting is a quick connect coupling and in accordance with another embodiment of the invention, the fitting is valve assembly.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
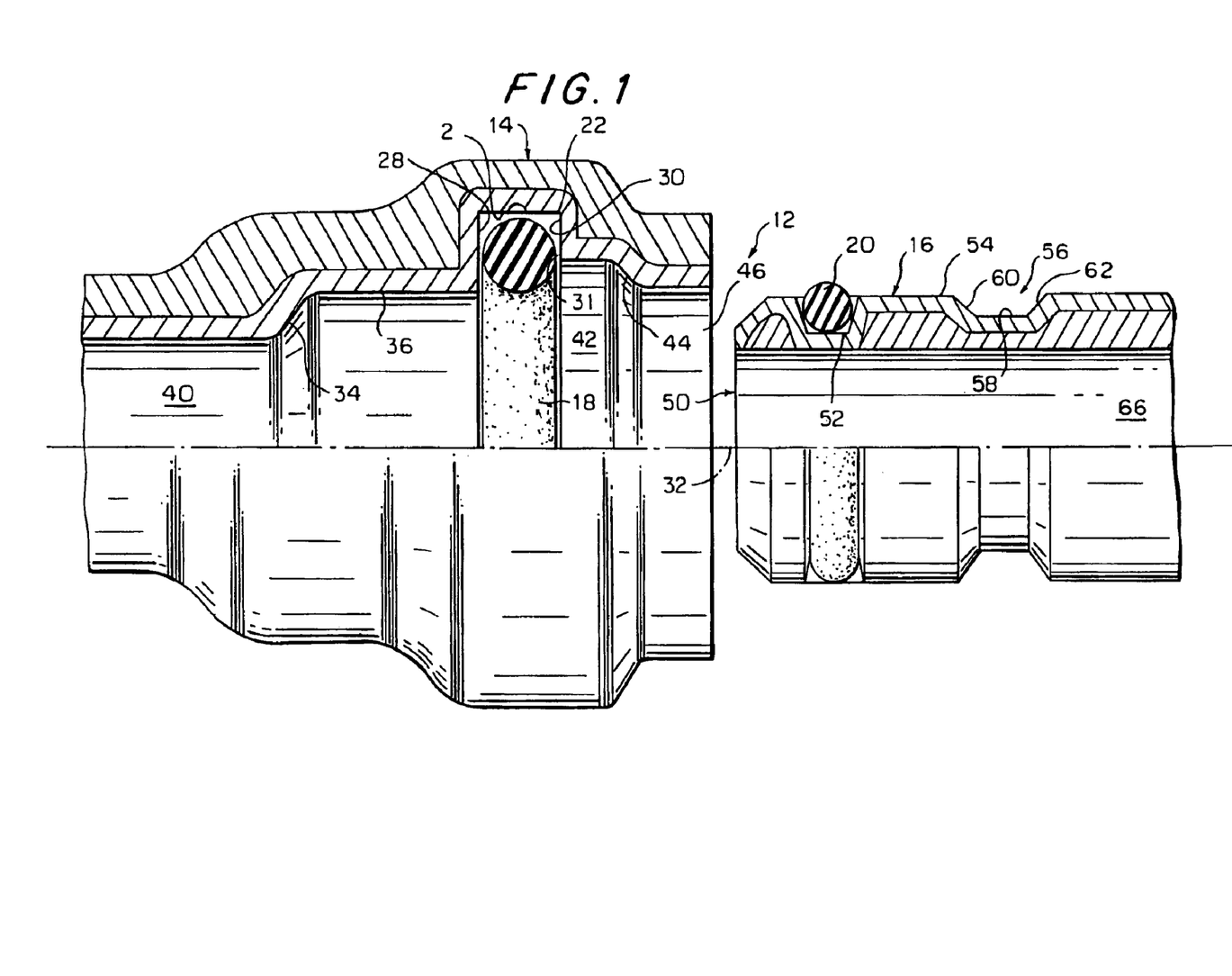
FIG. 1 is a side elevation of female and male components of a first embodiment a quick connect coupling prior to coupling the components.

Referring now to FIG. 1 there is shown a first embodiment 12 of a quick connect coupling in accordance with the present invention having as components a receptacle or female member 14, a male member 16, a locking O-ring 18 and primary sealing O-ring 20.

Initially, the female member 14 has the locking O-ring 18 axially positioned in its relaxed state in an inwardly opening groove 22. The groove 22 has a floor 26 radially extending to side walls 28 and 30, the wall 30 terminating in an annular edge 31. Wall 28 begins closer to the axis 32 of the female member 14 and has a wider surface area than the wall 30. Inboard of the wall 28 there is a frusto-conical stop surface 34 extending from inner cylindrical land 36 of the female member 14 to a tubular member or portion 40, which may be a tube formed integrally or unitarily with the female member 14.

Extending forwardly from front wall 30 of the inwardly opening groove 22 is a second cylindrical land 42 which has a diameter greater than the first cylindrical land 36 and an axial extent substantially less than the first cylindrical land. The second cylindrical land 42 joins a frusto-conical surface 44 which extends radially inward toward the axis 32 of the female member 14. The frusto-conical shoulder 44 joins a cylindrical inlet surface 46 which has an inner diameter substantially the same as the inner diameter of the first cylindrical land 36.

The male member 16 has a frusto-conical nose portion 50 and an outwardly opening groove 52 in which the primary sealing O-ring 20 is seated. Groove 52 is joined by a cylindrical portion 54 to a second outwardly opening groove 56. The second outwardly opening groove 56 has a cylindrical floor 58 and first and second frusto-conical walls 60 and 62 which make the groove 56 concave by flaring away from the cylindrical floor 56. The male member 16 then continues as a tube 66 which may be integral or unitary with the male member 16, and in a usual application, has a diameter equal to the diameter of the tube 40 with which the female member 14 is joined.

Figure 2:
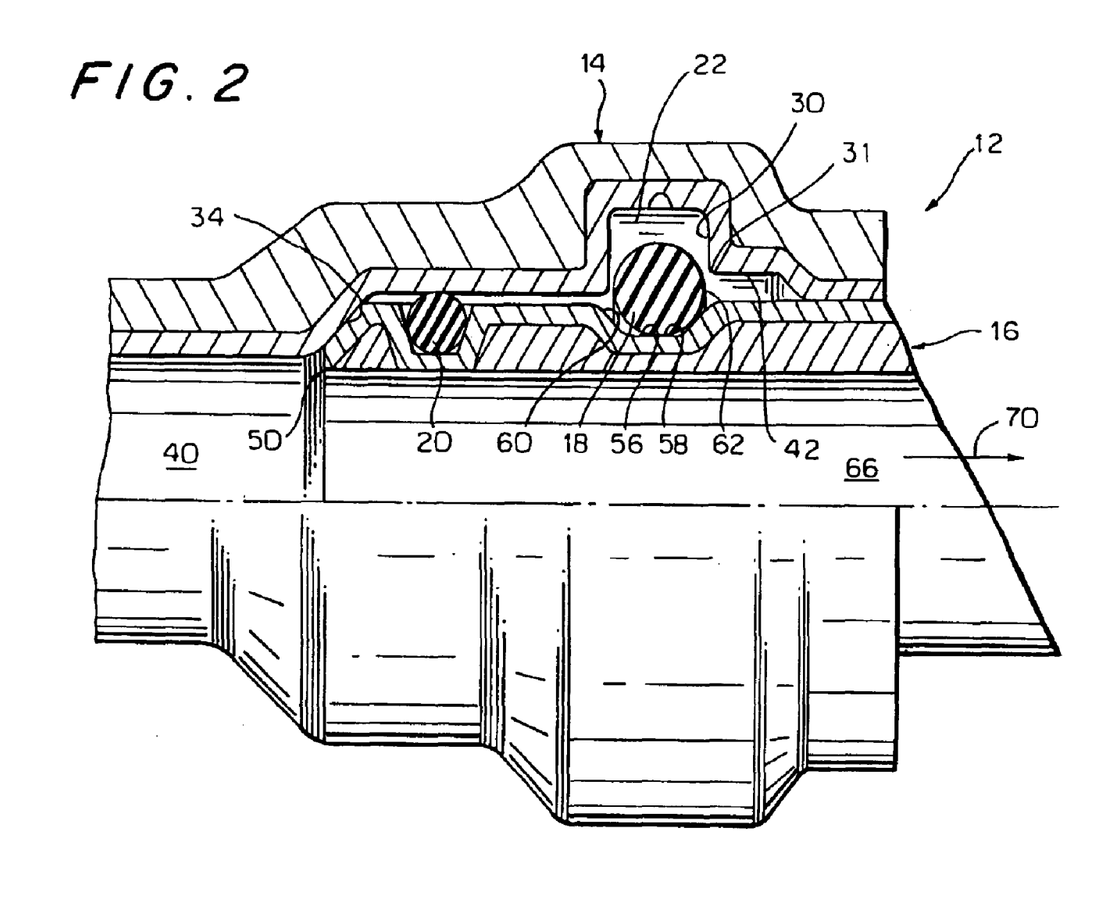
FIG. 2 is a side elevation of the quick connect coupling of FIG. 1 showing the components being joined.

Referring now to FIG. 2 where the male member 16 is shown being inserted into the female member 14, it is seen that nose 50 of the male member 16 dilates the elastic O-ring 18 allowing the male member 16 to slide into the female member 14 until the frusto-conical nose 50 abuts the frusto-conical surface 34 on the female member. At this point, the O-ring 18 which has expanded against its elasticity further into the inwardly opening groove 22 then contracts so as to seat in the outwardly opening groove 56 in male member 16.

Upon pressurizing the tube 40 connected to the female member 14, or upon pressurizing the tube 66 connected to the male member 16 so that there is pressure within the tubes, fluid pressure on the primary O-ring 20 forces the male member 16 to move with respect to the female member in the direction of arrow 70. Since the locking O-ring 18 is constrained by the outwardly opening groove 56, the O-ring is forced by the frusto-conical surface 60 to deform against the edge 31 joining the cylindrical land 42 to the second wall of the female member 14. This causes the O-ring 18 to be squeezed through a gap 72 between the edge 31 on the female member 14 and the frusto-conical surface 60 of groove 56 on male member 16.

Figure 3:
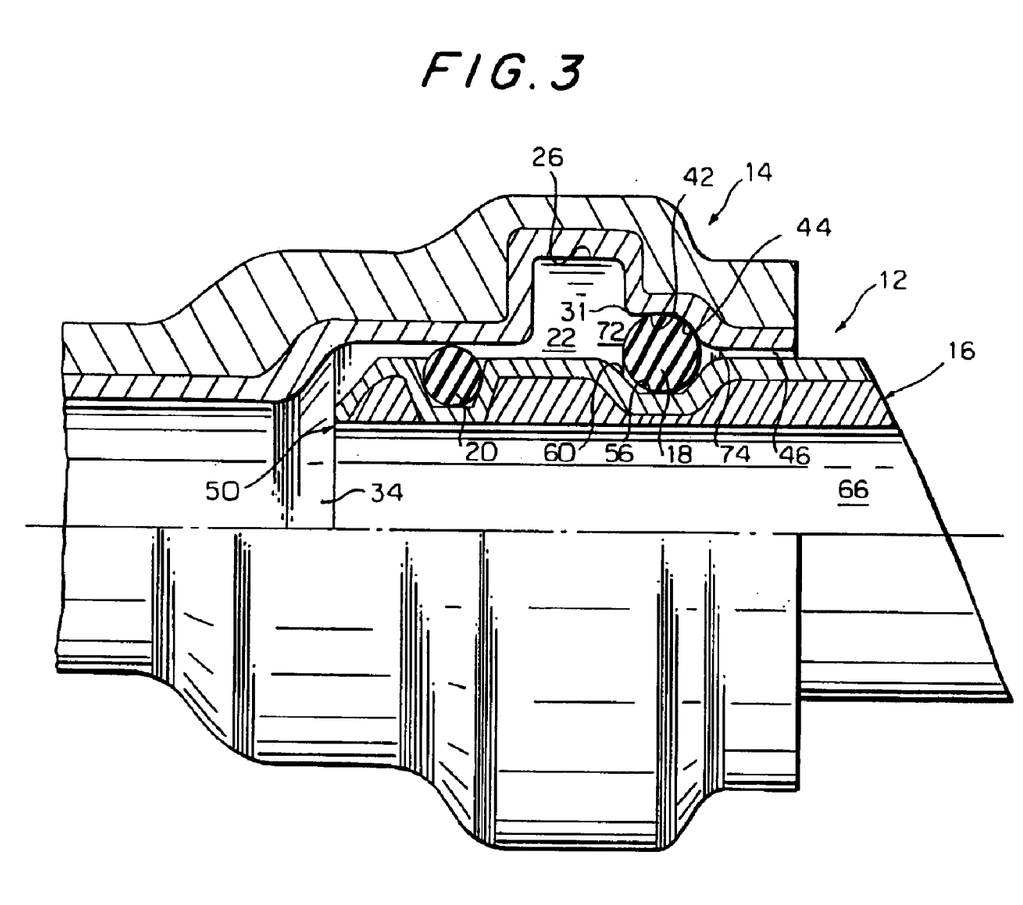
FIG. 3 is a side elevation of the quick connect coupling of FIGS. 1 and 2 in coupled together.

As is seen in FIG. 3, the locking O-ring 18 then abuts frusto-conical shoulder 44 extending from cylindrical surface 42 to the cylindrical inlet surface 46 which prevents further axial motion of the male member 16 in the direction of arrow 70. The male member 16 is then permanently locked within the female member 14.

Since the locking O-ring 18 is resilient and deformable, it forms a secondary seal which seals the gap 74 between the male member 16 and the female member 14. Accordingly, seal 18 for at least some applications is sufficient to both lock and seal the coupling 12, in which case the seal 20 may be deleted or is considered as an additional sealing O-ring supplementing the sealing action of the O-ring 18.

While utilizing pressure within the tubular portions 40 and 66 to effect coupling the male and female members 14 and 16, it should be kept in mind that locking should also be effected by simply pulling the male member 16 and female member 14 in opposite directions to move from the FIG. 2 position to the FIG. 3 position.

Figure 4:
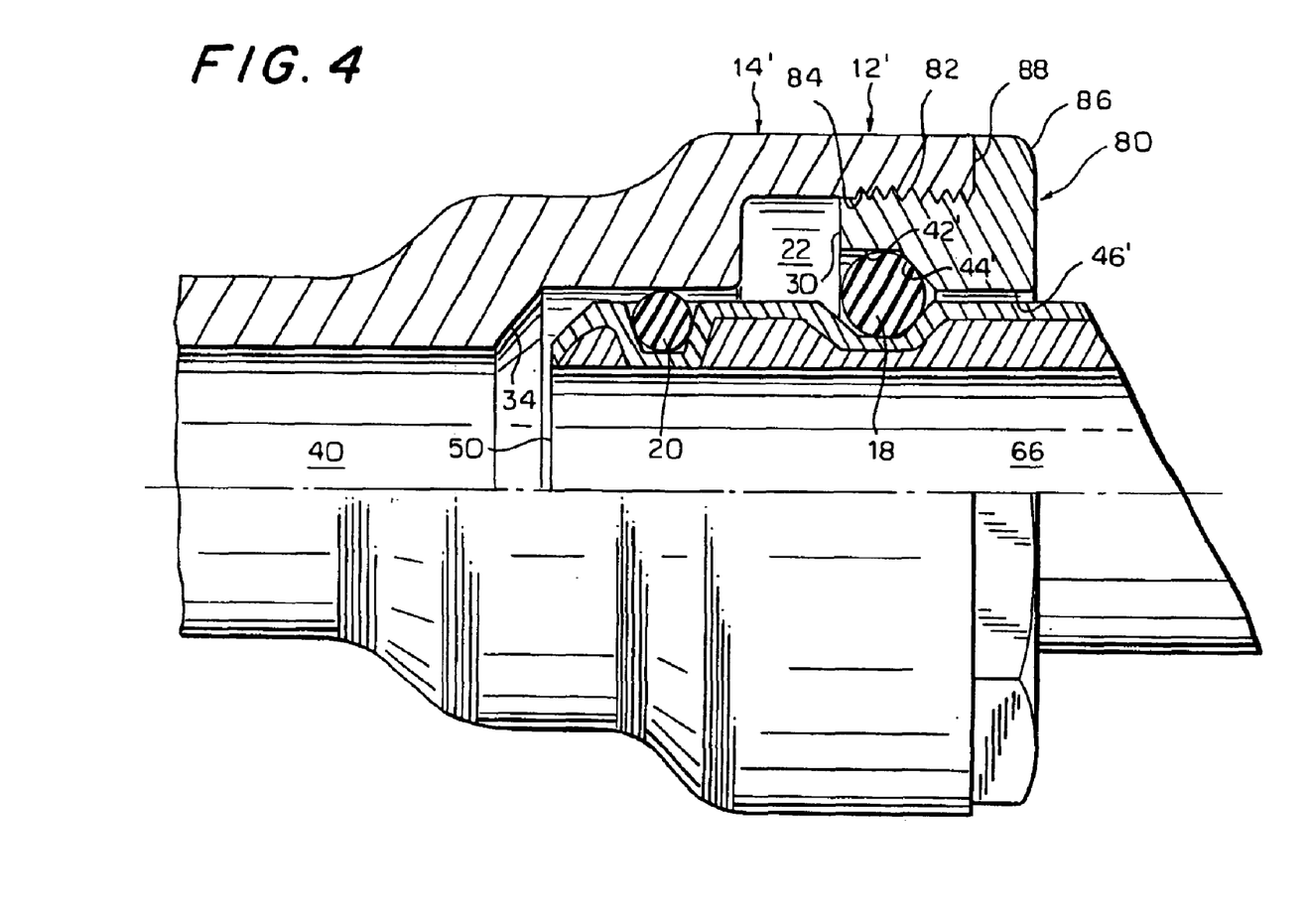
FIG. 4 is a side elevation of a second embodiment of a quick connect coupling in accordance with the present invention.
Figure 5:
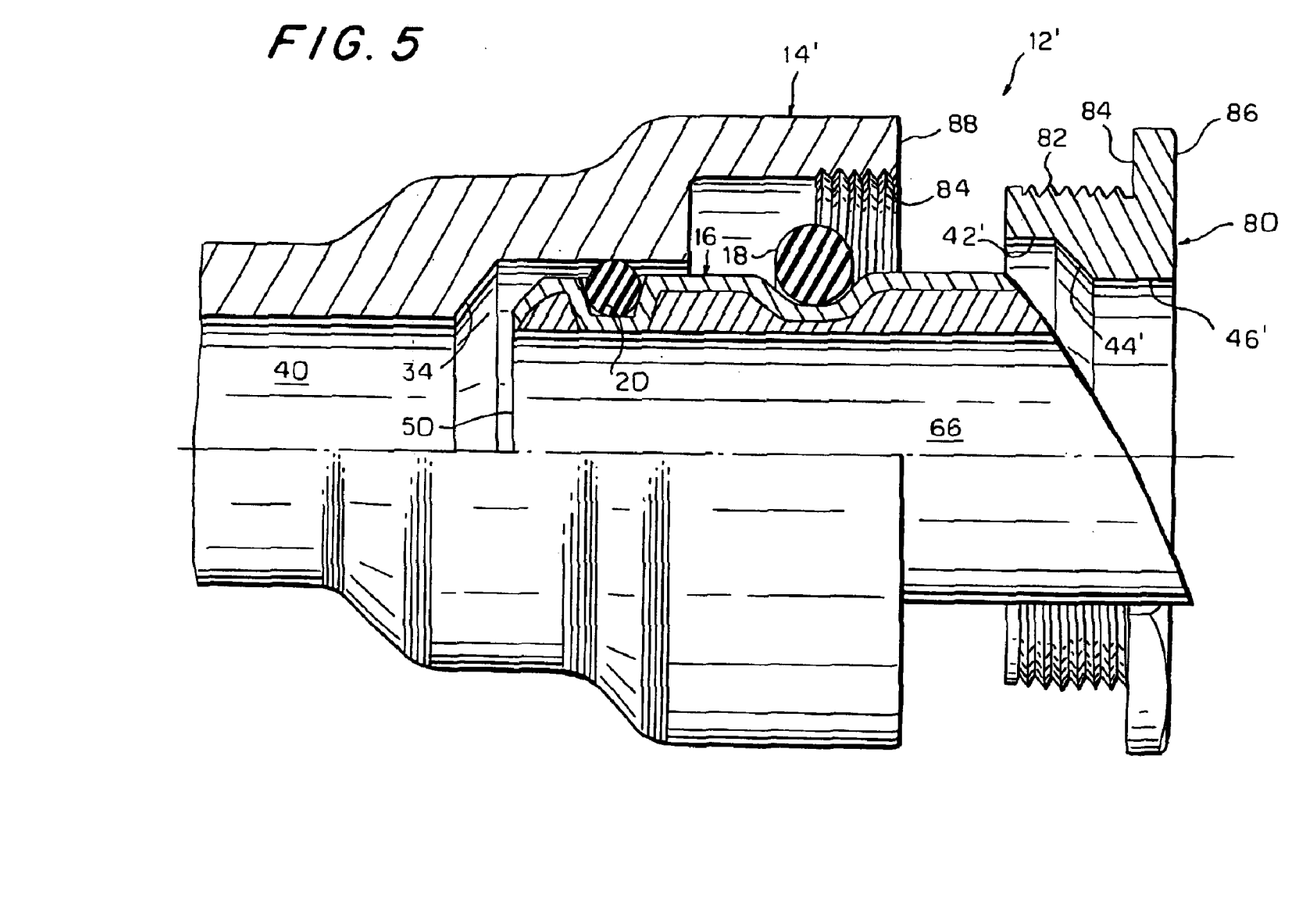
FIG. 5 is a side elevation of the quick connect coupling of FIG. 4 but showing ma nd female components after decoupling.

Referring now to FIGS. 4 and 5 where a second embodiment 12' of the quick connect coupling is shown, the radial surface 30', cylindrical land 42', frusto-conical shoulder 44' and cylindrical inlet 46' form part of a stop nut 80 which has external threads 82 which thread into internal threads 84 on the female member 14'. Stop nut 80 has radial shoulder 86 which abuts an end 88 on the female member 14'. Preferably, coupling of the female member 14' and the male member 16 is accomplished in the same manner as illustrated in FIGS. 1–3. While coupling as illustrated in FIGS. 1–3 is preferable, it is also possible to effect coupling by inserting the male member 16 into the female member 14 prior to threading the lock nut 80 into the end of the female member.

The quick-connect coupling of FIGS. 1–3 is permanent, whereas the coupling of FIGS. 4 and 5 can be decoupled by removing the stop nut 80 so that the locking O-ring 18 is no longer restrained axially by the frusto-conical shoulder 44'.

The female member 14, which can be configured as a receptacle or port as well as a tube, may be machined or molded as is the case with the male member 16. Optionally, the female member 14 and male member 16 may be formed by stamping. The material may be metal or plastic depending on its application.

Referring now to FIGS. 6–10 where a second embodiment of the fitting is shown, it is seen that the fitting is now configured as a valve assembly 100 comprising three main parts, i.e. a valve stem 102, a valve body 104 and an O-ring 106. The valve stem 102 comprises a male member in the form of a plug while the valve body 104 comprises a receptacle or female member.

Figure 6:
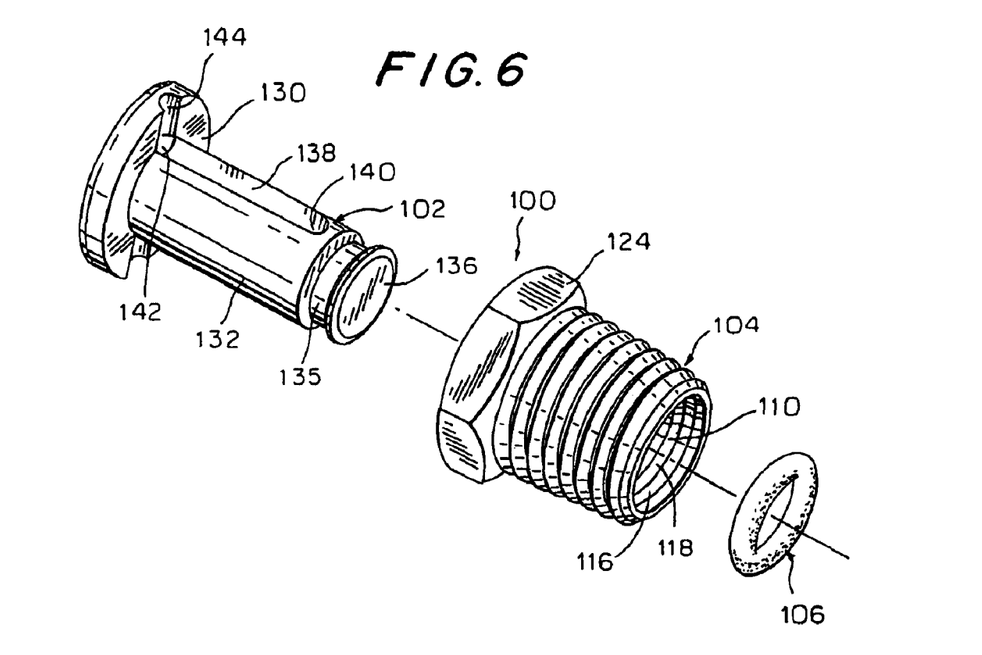
FIG. 6 is a perspective view o the components of a fitting in accordance with the preset invention configured as a valve.

As is seen in the elevational views, the valve body 104 has a bore 110 therethrough defined by a cylindrical inner wall. The bore 110 has a first end 112 and a second end 114. The second end 114 is relieved to provide a recess 116 having a shoulder 118. The shoulder 118 is slightly frusto-conical. The valve body 104 has exterior threads 120 thereon threading onto a container or other device which has fluid therein, such as but not limited to pressurized air or a liquid. A hex nut flange 124 having end face 126 is unitary with the valve body 104.

The valve stem or male member 102 has an end flange 130 projecting radially therefrom and a shank portion 132. The shank portion 132 has outwardly opening groove 134 at second end 135 thereof and a longitudinal opening 138 in the form of an outwardly opening groove. Preferably, there are two grooves 138 disposed at 180° from one another. Grooves 138 have first end 140 which is disposed approximate the annular groove 135 and a second end 142 that communicates with a radial groove 144 in the end flange 130.

Figure 7:
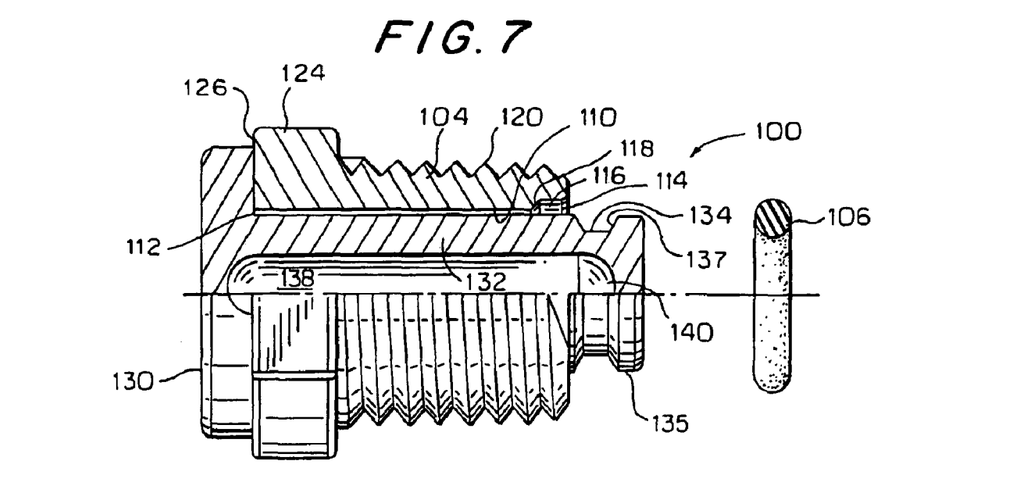
FIG. 7 is a side view, partially in elevation, of a valve in accordance with the present invention showing components of the valve prior to final assembly.

In order to assemble the valve assembly 100, the valve stem 102, valve body 104 and O-ring 106 are aligned as in FIG. 6 and partially assembled as in FIG. 7 by inserting the valve stem 102 through the bore 110 of the valve body. As is seen in FIGS. 8A and 8B, the O-ring 106 is then expanded over the end 136 of the valve stem 104 and seated in the annular groove 135.

Figure 8A:
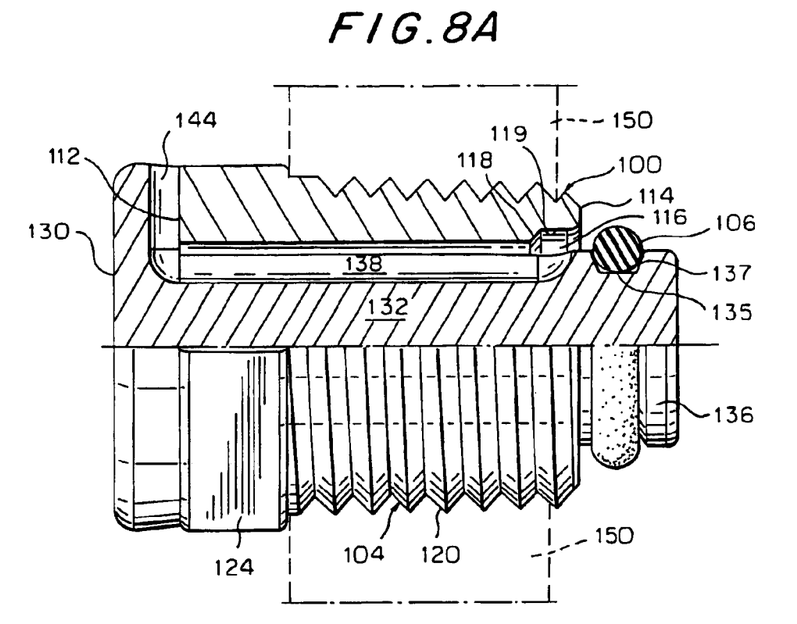
FIG. 8A is a side elevation showing the components assembled with the valve open.
Figure 8B:
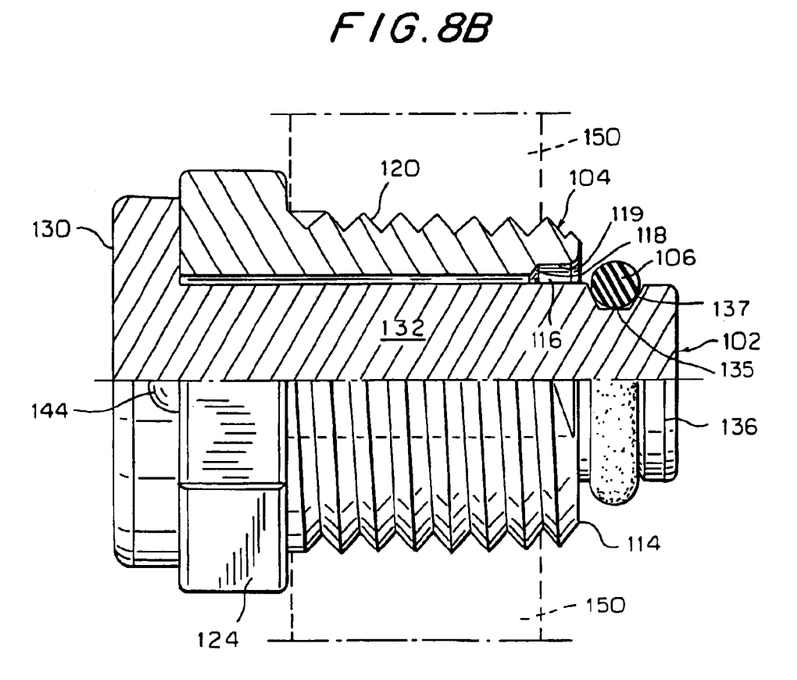
FIG. 8B is a side elevation oriented 90° to FIG. 8A.
Figure 9A:
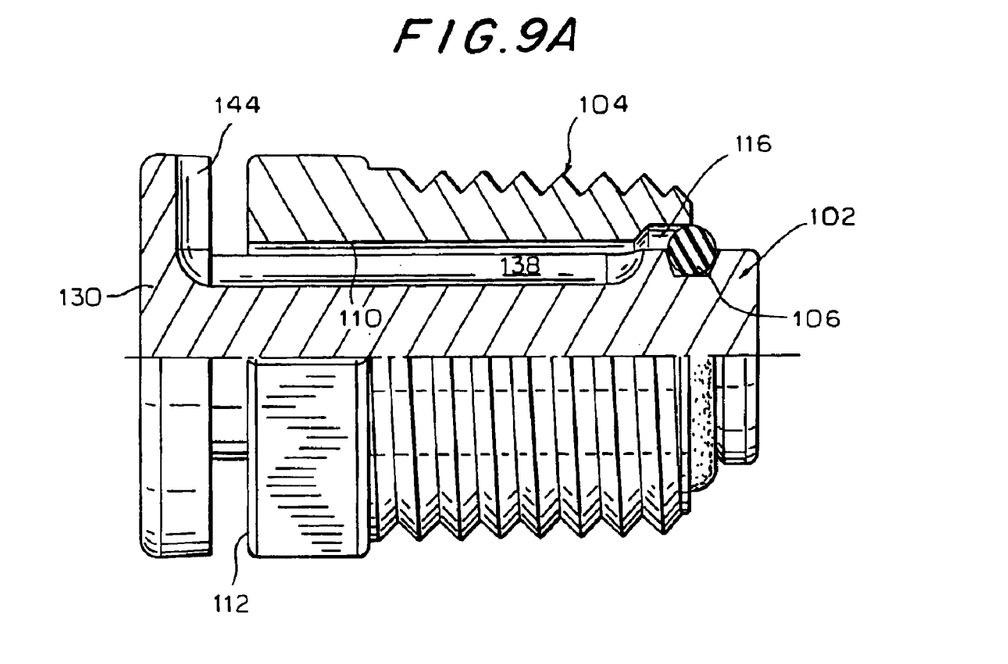
FIG. 9A is a side elevation showing the valve in an intermediate position where it is closing.
Figure 9B:
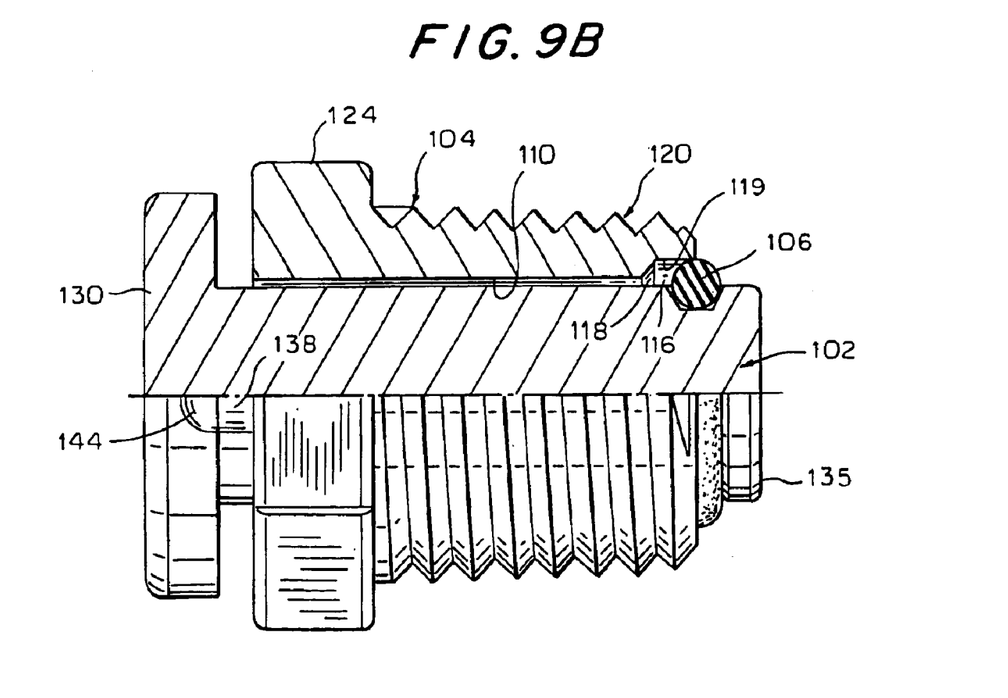
FIG. 9B is a side elevation oriented at 90° to FIG. 9A.
Figure 10A:
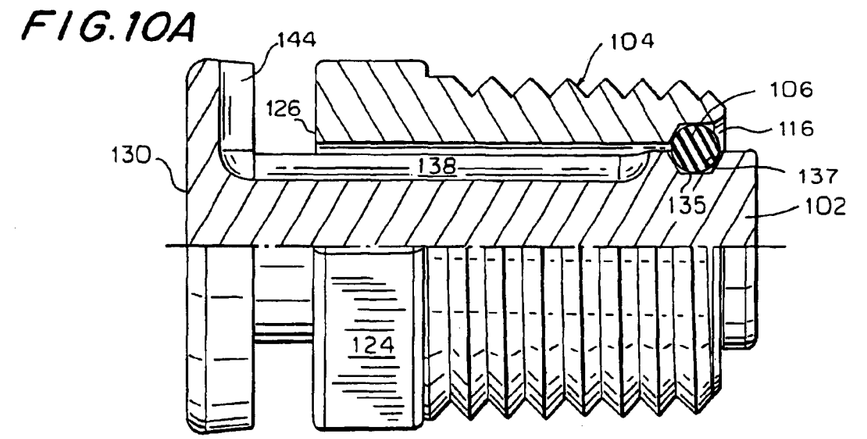
FIG. 10A is a side elevation showing the valve closed.
Figure 10B:
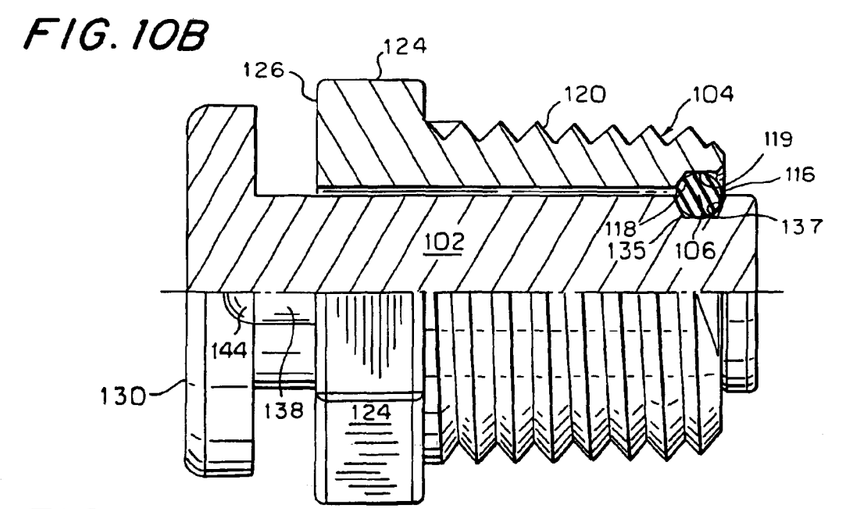
FIG. 10B is a side elevation oriented at 90° to FIG. 10A.

The valve assembly 100 shown in FIGS. 8A and 8B is then screwed into a wall 150 (shown in dotted lines) of a container or other device which has fluid therein. If the fluid is a pressurized fluid, such as compressed air, pressure against the end face 136 of the valve stem 102 will force the valve stem to move through the intermediate position of FIGS. 9A and 9B to the position of FIGS. 10A and 10B where the O-ring 106 seats against the frustoconical shoulder 118 of the annular recess 116. The O-ring seals the gap between valve stem 102 and the wall of bore 110 by abutting and deforming against frusto-conical shoulder 118 and the cylindrical surface 119 and the annular recess 116. In addition, the O-ring 106 is pressed against the surface 137 which defines groove 135 so that the fluid behind the wall 150 does not escape through the end 140 of the gap 138.

When it is desired to relieve pressure behind the wall 150, the end flange 130 of the valve is simply pressed back against the face 126 on the valve body 104 so that the space formed by the groove 138 communicates with the space on the opposite side of the wall 150. This allows air to flow into the annular recess 116 in the valve body 114 and through the axial groove 138 in the shank 132 and radial groove 144 of the male member 102 (see FIG. 6) to exhaust air from behind the wall 150 to a lower pressure, such as that of the surrounding atmosphere. Upon repressurization, the valve stem 102 will again move from the FIGS. 8A and 8B to the FIGS. 10A and 10B position to close the valve.

Figure 11:
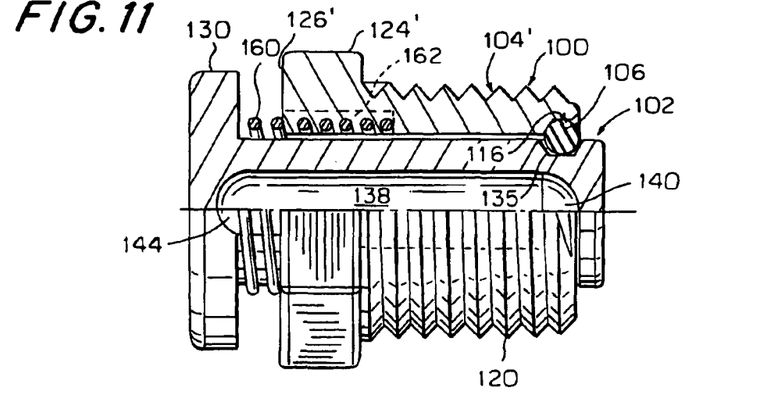
FIG. 11 is a side view of an additional embodiment of the valve of FIGS. 6–10, wherein the valve is biased to a closed position by a spring.

Referring now to FIG. 11 where an additional embodiment of the valve assembly 100' is shown, the fitting is similar to that of FIGS. 6–10 except that a coil spring 160 is disposed in an annular pocket 162 formed in valve body 104. The coil spring 160 presses against the flange 130 urging the flange to move away from the end face 126 of the valve body 104 to urge the valve assembly 100' to the closed position similar to the closed position of FIGS. 10A and 10B. Consequently, the valve 100' is automatically in the closed position. If the container is filled with water or a low pressure fluid which may not exert sufficient pressure against the valve stem 102 to urge the valve stem from its open position of FIGS. 8A and 8B to its closed position of FIGS. 10A and 10B, the spring 160 supplies the necessary force to close the valve 100'. If it is desired to vent through the valve 100', then the valve stem 102 is pressed back against the end face 126 of the valve body 104 so that the groove 138 is open to the space beyond the valve body 104 and fluid can escape through the axial groove 138 and radial groove 144 into the surrounding environment.

From the foregoing description, one skilled in the art can easily ascertain the essential characteristics of this invention, and without departing from the spirit and scope thereof, can make various changes and modifications of the invention to adapt it to various usages and conditions.

I claim:

1. A fitting comprising:
    a female member defined by an inner wall and having a first end and a second end, the inner wall including a first land adjacent the first end and a shoulder adjacent the second end, a second land adjoining the shoulder and having a diameter greater than that of the first land, the second land and the shoulder defining a recess;
    a male member having an exteriorly opening groove, the recess and groove together defining a gap, wherein at least one of the female member and the male member includes an opening extending therethrough;
    an O-ring seated within the gap when the fitting is in a locked position to prevent removal of the male member from the female member;
    wherein the male member is a plug axially movable between an open position in which at least a portion of the gap is maintained and the locked position wherein the gap is closed, the plug including an end flange opposite the groove and at least one elongated opening extending axially along the male member between the groove and the end flange to allow fluid to pass through the male member when the fitting is in the open position, the elongated opening extends from a location adjacent the groove and terminates within the end flange; and
    wherein a radial groove intersects the elongated opening, the radial groove formed within the end flange.

2. A fitting comprising:
    a female member defined by an inner wall and having a first end and a second end, the inner wall including a first land adjacent the first end and a shoulder adjacent the second end, a second land adjoining the shoulder and having a diameter greater than that of the first land, the second land and the shoulder defining a recess;
    a male member having an exteriorly opening groove, the recess and groove together defining a gap, wherein at least one of the female member and the male member have an opening extending therethrough;
    an O-ring seated within the gap when the fitting is in a locked position to prevent removal of the male member from the female member; and
    wherein the male member is a plug axially movable between an open position in which at least a portion of the gap is maintained and the locked position wherein the gap is closed, the plug including an end flange opposite the groove and at least one elongated opening extending axially along the male member between the groove and the end flange to allow fluid to pass through the male member when the fitting is in the open position.

3. The fitting of claim 2 wherein the elongated opening extends from a location adjacent the groove and terminates within the end flange.

4. The fitting of claim 2 wherein the elongated opening has an axial length sufficient to open at opposite ends of the female member.

5. A fitting comprising:
    a female member defined by an inner wall and having a first end and a second end, the inner wall including a first land adjacent the first end and a shoulder adjacent the second end, a second land adjoining the shoulder and having a diameter greater than that of the first land, the second land and the shoulder defining a recess;
    a male member having an exteriorly opening groove, the recess and groove together defining a gap;
    an O-ring compressed within the gap when the fitting is in a locked position to prevent removal of the male member from the female member and configured to seal the gap between the male member and the female member; and
    wherein at lease one of the female member and the male member have an opening extending therethrough and the male member is a plug axially movable between an open position in which at least a portion of the gap is maintained and the locked position wherein the gap is closed, the plug including an end flange opposite the groove and at least one elongated opening extending axially along the male member between the groove and the end flange to allow fluid to pass through the male member when the fitting is in the open position.

6. The fitting of claim 5 wherein the elongated opening extends from a location adjacent the groove and terminates within the end flange.

7. The fitting of claim 5 wherein the elongated opening has an axial length sufficient to open at opposite ends of the female member.

* * * * *